(12) United States Patent
Ryu et al.

(10) Patent No.: US 11,996,065 B2
(45) Date of Patent: May 28, 2024

(54) DISPLAY DRIVING CIRCUIT, DISPLAY DEVICE INCLUDING THE SAME, AND METHOD OF OPERATING THE SAME

(71) Applicant: SAMSUNG ELECTRONICS CO., LTD., Suwon-si (KR)

(72) Inventors: Kyungho Ryu, Suwon-si (KR); Kyongho Kim, Suwon-si (KR); Yongyun Park, Suwon-si (KR); Kilhoon Lee, Suwon-si (KR); Yeongcheol Rhee, Suwon-si (KR); Taeho Lee, Suwon-si (KR); Hyunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/985,599

(22) Filed: Nov. 11, 2022

(65) Prior Publication Data
US 2023/0143912 A1 May 11, 2023

(30) Foreign Application Priority Data

Nov. 11, 2021 (KR) .......... 10-2021-0155154
May 11, 2022 (KR) .......... 10-2022-0058028

(51) Int. Cl.
*G09G 5/00* (2006.01)

(52) U.S. Cl.
CPC ......... *G09G 5/008* (2013.01); *G09G 2370/04* (2013.01)

(58) Field of Classification Search
CPC .... G09G 2370/04; G09G 5/008; H04L 1/205; G01R 31/31727
See application file for complete search history.

(56) References Cited

U.S. PATENT DOCUMENTS

| | | |
|---|---|---|
| 6,784,653 B2 | 8/2004 | Baumert |
| 7,721,134 B2 | 5/2010 | Cranford, Jr. et al. |
| 7,787,536 B2 | 8/2010 | Chou |
| 8,443,243 B2 | 5/2013 | Matsumoto et al. |
| 9,184,904 B2 | 11/2015 | Doi |
| 10,277,431 B2 | 4/2019 | Tajalli |
| 2004/0183518 A1 | 9/2004 | Weller et al. |

(Continued)

OTHER PUBLICATIONS

Analui et al., "A 10-GB/s Two-Dimensional Eye-Opening Monitor in 0.13-um Standard CMOS", 2005, IEEE Journal of Solid-State Circuits, vol. 40, Issue 12, 11 pages total.

(Continued)

*Primary Examiner* — Abbas I Abdulselam
(74) *Attorney, Agent, or Firm* — Sughrue Mion, PLLC

(57) ABSTRACT

Provided is a display driving circuit. The display driving circuit includes a clock data recovery circuit configured to receive a data signal and generate a clock signal and a first output data signal, an eye margin test circuit configured to sample the data signal by using the clock signal, based on a vertical measurement voltage and generate a second output data signal, and a bit error check circuit configured to measure a bit error rate of the data signal, based on the first output data signal and the second output data signal, wherein the clock data recovery circuit includes a jitter generator configured to generate jitter of the clock signal such that a jitter amplitude varies according to a horizontal control signal.

20 Claims, 19 Drawing Sheets

(56) References Cited

U.S. PATENT DOCUMENTS

2020/0333396 A1   10/2020   Zhao et al.

OTHER PUBLICATIONS

Noguchi et al., "A 40-GB/s CDR Circuit With Adaptive Decision-Point Control Based on Eye-Opening Monitor Feedback", 2008, IEEE Journal of Solid-State Circuits, vol. 43, Issue 12, 10 pages total.

Lin et al., "A 10-GB/s Eye-Opening Monitor Circuit for Receiver Equalizer Adaptations in 65-nm CMOS", 2019, IEEE Transactions on Very Large Scale Integration (VLSI) Systems, vol. 28, Issue 1, 13 pages total.

DISPLAY DRIVING CIRCUIT, DISPLAY DEVICE INCLUDING THE SAME, AND METHOD OF OPERATING THE SAME

CROSS-REFERENCE TO RELATED APPLICATIONS

This application is based on and claims priority under 35 U.S.C. § 119 to Korean Patent Application Nos. 10-2021-0155154, filed on Nov. 11, 2021, and 10-2022-0058028, filed on May 11, 2022 in the Korean Intellectual Property Office, the disclosures of which are incorporated by reference herein in their entireties.

BACKGROUND

1. Field

The disclosure relates to a display driving circuit, and more particularly, to a display driving circuit including a clock data recovery circuit and an eye margin test circuit, an operating method thereof, and a display device including the display driving circuit.

2. Description of Related Art

The display device may include a display panel configured to display an image and a display driving circuit configured to drive the display panel. The display driving circuit may drive the display panel by receiving image data from the outside and applying an image signal corresponding to the received image data to a data line of the display panel. Recently, users of an organic light-emitting diode (OLED) display panel, in which each of a plurality of pixels of a pixel array includes an OLED, have increased.

The display driving circuit may receive a data signal from a timing controller and generate various signals related to image representation by using the data signal. As the resolution of display devices has improved, an interface circuit capable of providing a data signal more efficiently and stably between the timing controller and the display driving circuit is in demand. In particular, there has been a growing need for a clock data recovery circuit recovering a clock signal and a data signal.

SUMMARY

The disclosure provides a display driving circuit including an eye margin test circuit with reduced area. The eye margin test circuit may be configured to measure an eye margin of a data signal at a high speed. Also, the disclosure provides a display device including the display driving circuit, and a method of operating the display driving circuit.

According to an aspect of the disclosure, there is provided a display driving circuit including: a clock data recovery circuit configured to: receive a data signal, and generate a clock signal and a first output data signal, the clock data recovery circuit including a jitter generator configured to generate jitter of the clock signal and vary an amplitude the jitter according to a horizontal control signal; an eye margin test circuit configured to: sample the data signal by using the clock signal, based on a vertical measurement voltage, and generate a second output data signal based on the sampled data signal; and a bit error check circuit configured to measure a bit error rate of the data signal, based on the first output data signal and the second output data signal.

The jitter generator may be further configured to adjust a frequency of the jitter according to the horizontal control signal.

The clock data recovery circuit may include: a sampler configured to sample the data signal by using the clock signal and generate a sample signal; a phase locked loop (PLL) circuit including the jitter generator and configured to generate the clock signal according to the sample signal; and a deserializer configured to receive the sample signal and generate the first output data signal.

The PLL circuit may further include a voltage controlled oscillator configured to generate the clock signal, and wherein the jitter generator may include: a clock divider configured to receive the clock signal and generate a frequency adjust clock signal according to a frequency control signal included in the horizontal control signal; a counter configured to operate a counting operation by using the frequency adjust clock signal and generate a first current control signal and a second current control signal according to an amplitude control signal included in the horizontal control signal; a first variable current source configured to generate a current provided to the voltage controlled oscillator according to the first current control signal; and a second variable current source configured to generate a current provided to the voltage controlled oscillator according to the second current control signal.

A level of a current generated by the first variable current source may increase as the first current control signal increases, and a level of a current generated by the second variable current source may decrease as the second current control signal increases.

When a level of the first current control signal reaches a level of the horizontal control signal, the counter may be configured to suspend the counting operation.

When the frequency adjust clock signal has a logic low level, the counter may be configured to generate the first current control signal such that a current generated by the first variable current source is 0.

The counter may be configured to generate the second current control signal such that an average of a change of a current generated by the first variable current source and a change of a current generated by the second variable current source is 0.

The eye margin test circuit may include: a digital-analog converter configured to perform digital-analog conversion on a vertical control signal to generate the vertical measurement voltage; a sampler configured to sample the data signal by using the clock signal based on the vertical measurement voltage, and generate a sample signal; and a deserializer configured to receive the sample signal and generate the second output data signal.

The vertical measurement voltage may correspond to the amplitude of the jitter.

The display driving circuit may further include an equalizer circuit configured to receive an input data signal from outside and transmit the input data signal as the data signal to the clock data recovery circuit and the eye margin test circuit.

According to another aspect of the disclosure, there is provided a method of operating a display driving circuit, the method including: generating a clock signal including jitter and varying an amplitude the jitter according to a horizontal control signal; generating a vertical measurement voltage according to a vertical control signal; sampling a data signal by using the clock signal and the vertical measurement voltage; and generating an eye margin test result signal of the data signal according to a sampled data signal.

The sampling may include: sampling the data signal based on the vertical measurement voltage having a first voltage level and the clock signal including the jitter having a first jitter amplitude corresponding to the first voltage level; sampling the data signal based on the vertical measurement voltage having a second voltage level and the clock signal including the jitter having a second jitter amplitude corresponding to the second voltage level; and sampling the data signal based on the vertical measurement voltage having a third voltage level and the clock signal including the jitter having a third jitter amplitude corresponding to the third voltage level.

An eye margin test target of an eye opening of the data signal may be set for an eye margin measurement operation on the data signal, the first voltage level and the first jitter amplitude correspond to an upper measurement point of the eye margin test target, wherein the second voltage level and the second jitter amplitude correspond to a middle measurement point of the eye margin test target, and wherein the third voltage level and the third jitter amplitude correspond to a lower measurement point of the eye margin test target.

The method may further include: receiving a data signal of a training pattern; generating a plurality of clock signals, each having a jitter amplitude different from each other according to calibration codes; sampling the data signal of the training pattern by using each of the plurality of clock signals; measuring bit error rates of the data signal of the training pattern based on each of sampled data signals; and mapping the calibration codes on a value of a unit interval (UI) based on the measured bit error rates.

The mapping comprises mapping a calibration code, in which a bit error is first generated, among the calibration codes, to the data signal of the training pattern, on the UI as a reference code.

The method may further include: storing a mapping table according the mapping of the calibration codes; and setting a maximum value of the horizontal control signal to be the UI according to the mapping table.

The generating of the clock signal may include adjusting a jitter frequency of the jitter and a jitter amplitude of the jitter according to the horizontal control signal.

The vertical measurement voltage may correspond to the jitter amplitude.

According to another aspect of the disclosure, there is provided a display device configured to operate in a normal mode and an eye margin test (EMT) mode, the display device including: a timing controller configured to transmit an input data signal and a control signal in the EMT mode; and a display driving circuit configured to receive the input data signal and the control signal to perform an eye margin measurement operation on the input data signal, wherein the display driving circuit is further configured to: generate a clock signal including jitter based on the input data signal and the control signal; generate a vertical measurement voltage based on the control signal; and sample data signal, which is generated based on the input data signal, by using the clock signal to perform the eye margin measurement operation based on the vertical measurement voltage, wherein a jitter amplitude of the jitter and a level of the vertical measurement voltage vary according to the control signal.

The display driving circuit may include: an equalizer circuit configured to generate the data signal from the input data signal; a clock data recovery circuit configured to receive the data signal and generate the clock signal and a first output data signal; an eye margin test circuit configured to sample the data signal by using the clock signal based on the vertical measurement voltage and generate a second output data signal; and a bit error check circuit configured to measure a bit error rate of the data signal, based on the first output data signal and the second output data signal.

The clock data recovery circuit may include: a sampler configured to sample the data signal by using the clock signal and generate a sample signal; a phase locked loop (PLL) circuit configured to generate the clock signal according to the sample signal; and a deserializer configured to receive the sample signal and generate the first output data signal.

The PLL circuit comprises a voltage controlled oscillator configured to generate the clock signal and a jitter generator configured to generate jitter of the clock signal, and wherein the jitter generator may include: a clock divider configured to receive the clock signal and generate a frequency adjust clock signal according to a frequency control signal included in the control signal; a counter configured to operate a counting operation by using the frequency adjust clock signal and generate a first current control signal and a second current control signal according to an amplitude control signal included in the control signal; a first variable current source configured to generate a current provided to the voltage controlled oscillator according to the first current control signal; and a second variable current source configured to generate a current provided to the voltage controlled oscillator according to the second current control signal.

The eye margin test circuit may include: a digital-analog converter configured to perform digital-analog conversion on a vertical control signal included in the control signal to generate the vertical measurement voltage; a sampler configured to sample the data signal by using the clock signal based on the vertical measurement voltage, and generate a sample signal; and a deserializer configured to receive the sample signal and generate the second output data signal.

The timing controller may be configured to transmit an EMT mode setting value to the display driving circuit, and wherein the EMT mode setting value may include information regarding a vertical offset and a horizontal offset for the eye margin measurement operation and information regarding a threshold value for determining a pass/fail of the EMT mode.

The timing controller may be further configured to transmit a data signal of a training pattern to the display driving circuit, wherein the display driving circuit performs a calibration operation according to the data signal of the training pattern, and wherein the calibration operation may include: generating a plurality of clock signals, each having a jitter amplitude different from each other according to calibration codes; sampling the data signal of the training pattern by using each of the plurality of clock signals; measuring bit error rates of the data signal of the training pattern based on each of sampled data signals; and mapping the calibration codes on a value of a unit interval based on the measured bit error rates.

The display driving circuit may be further configured to: perform the eye margin measurement operation at a first measurement point by receiving a first input data signal of a random pattern and a first control signal in a first frame from the timing controller; perform the eye margin measurement operation at an $n^{th}$ measurement point by receiving an $n^{th}$ input data signal of a random pattern and an $n^{th}$ control signal in an $n^{th}$ frame from the timing controller, where n is a natural number greater than or equal to 2; and determine the first measurement point according to the first control signal and the $n^{th}$ measurement point according to the $n^{th}$ control signal.

An EMT target of an eye opening of the data signal may be set for the eye margin measurement operation, and wherein the first to $n^{th}$ measurement points may include an upper measurement point of the EMT target, a middle measurement point of the EMT target, and a lower measurement point of the EMT target.

The display driving circuit may be configured to transmit an EMT mode performance result obtained by performing the eye margin measurement operation to the timing controller, and the timing controller may be configured to receive the EMT mode performance result and converts the EMT mode to the normal mode to display an image.

The vertical measurement voltage may correspond to the jitter amplitude.

According to another aspect of the disclosure, there is provided a display driving circuit including: a memory storing one or more instructions; and a processor configured to execute the one or more instructions to: receive a data signal, generate a clock signal and a first output data signal based on the data signal, generate jitter of the clock signal and vary an amplitude the jitter according to a horizontal control signal, sample the data signal by using the clock signal, based on a vertical measurement voltage, generate a second output data signal based on the sampled data signal, and measure a bit error rate of the data signal, based on the first output data signal and the second output data signal.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Hereinafter, various embodiments of the disclosure are described with reference to the accompanying drawings. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
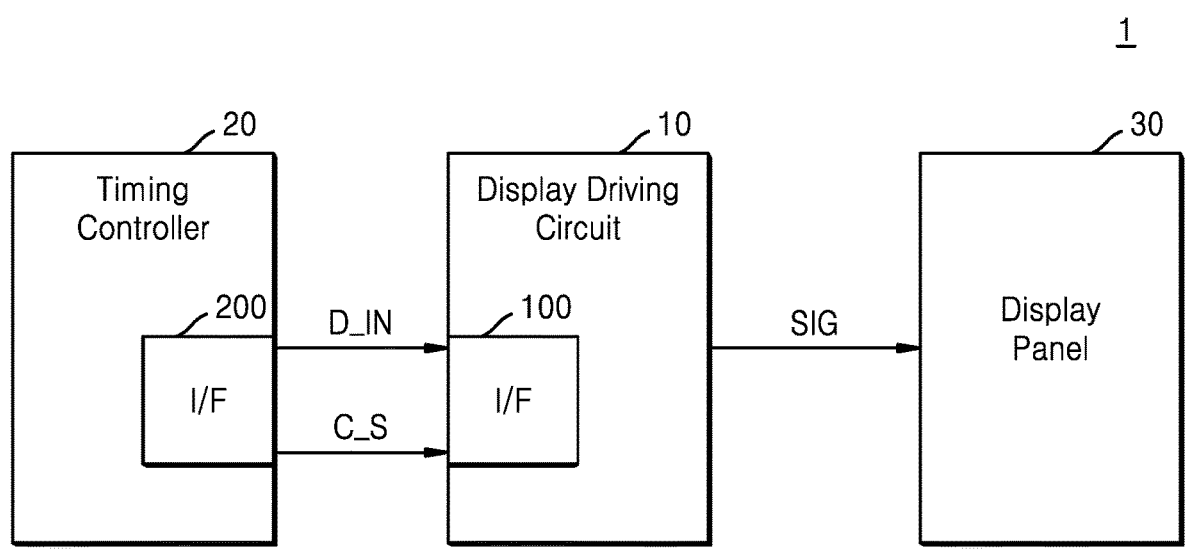
FIG. 1 is a block diagram of a display device according to an example embodiment.

FIG. 1 is a block diagram of a display device according to an example embodiment.

A display device 1 according to an example embodiment may be included in an electronic device having an image displaying function. For example, the electronic device may include a television, a smartphone, a tablet personal computer (PC), a portable multimedia player (PMP), a camera, a wearable device, a digital video disk (DVD) player, a refrigerator, an air conditioner, an air cleaner, a set-top box, a robot, a drone, various medical devices, a navigation device, a global positioning system (GPS) receiver, an advanced drivers assistance system (ADAS), vehicular devices, appliances, various measuring instruments, etc.

With reference to FIG. 1, the display device 1 may include a display driving circuit 10, a timing controller 20, and a display panel 30. According to an example embodiment, the display driving circuit 10 and the display panel 30 may be implemented as a single module. For example, the display driving circuit 10 may be mounted on a circuit film, such as a tape carrier package (TCP), a chip on film (COF), a flexible print circuit (FPC), etc., and be attached to the display panel 30 in a tape automatic bonding (TAB) manner, or mounted on a non-display area of the display panel 30 in a chip on glass (COG) manner.

The display device 1 may operate in a normal mode and in an eye margin test (EMT) mode. In the normal mode, the display device 1 may provide a display signal SIG to display an image on the display panel 30. In the EMT mode, the display device 1 may perform an eye margin measurement operation on an input data signal D_IN to determine whether an eye margin of the input data signal D_IN transmitted to the display driving circuit 10 is sufficient or not.

The timing controller 20 may include an interface circuit 200. The interface circuit 200 may receive image data and generate the input data signal D_IN according to the image data. For example, the interface circuit 200 may generate the input data signal D_IN so that pixel data corresponding to one pixel of the display panel 30 corresponds to one packet.

The timing controller 20 may control all operations of the display device 1 and control a driving timing of a data driver (e.g., 1110 of FIG. 15) and a gate driver (e.g., 1130 of FIG. 15) of the display driving circuit 10, based on control commands received from an external process, e.g., a main processor of an electronic device with the display device 1, or an image processing processor. The timing controller 20 may be implemented by hardware, software, or a combination of hardware and software, and may be implemented by, for example, digital logic circuits and registers performing functions described later.

The timing controller 20 may transmit the input data signal D_IN and a control signal C_S to the display driving circuit 10 through a channel. For example, a data driver control signal may be provided to a data driver, and the data driver may drive data lines respectively connected with pixels of the display panel 30, in response to the data driver control signal. A gate driver control signal may be provided to a gate driver, and the gate driver may drive gate lines respectively connected with pixels of the display panel 30, in response to the gate driver control signal.

The display driving circuit 10 may be referred to as a display driver integrated circuit (DDI). The display driving circuit 10 may include an interface (I/F) circuit 100 and receive the input data signal D_IN and the control signal C_S through the interface circuit 100. In an example embodiment, the timing controller 20 may provide a horizontal control signal (e.g., C_H of FIG. 2) and a vertical control signal (e.g., C_V of FIG. 2) so that the display driving circuit 10 performs an eye margin measurement operation on the input data signal D_IN in the EMT mode. The display driving circuit 10 may determine a measurement point at which an eye margin of a data signal is to be measured, according to the horizontal control signal C_H and the vertical control signal C_V.

Figure 2:
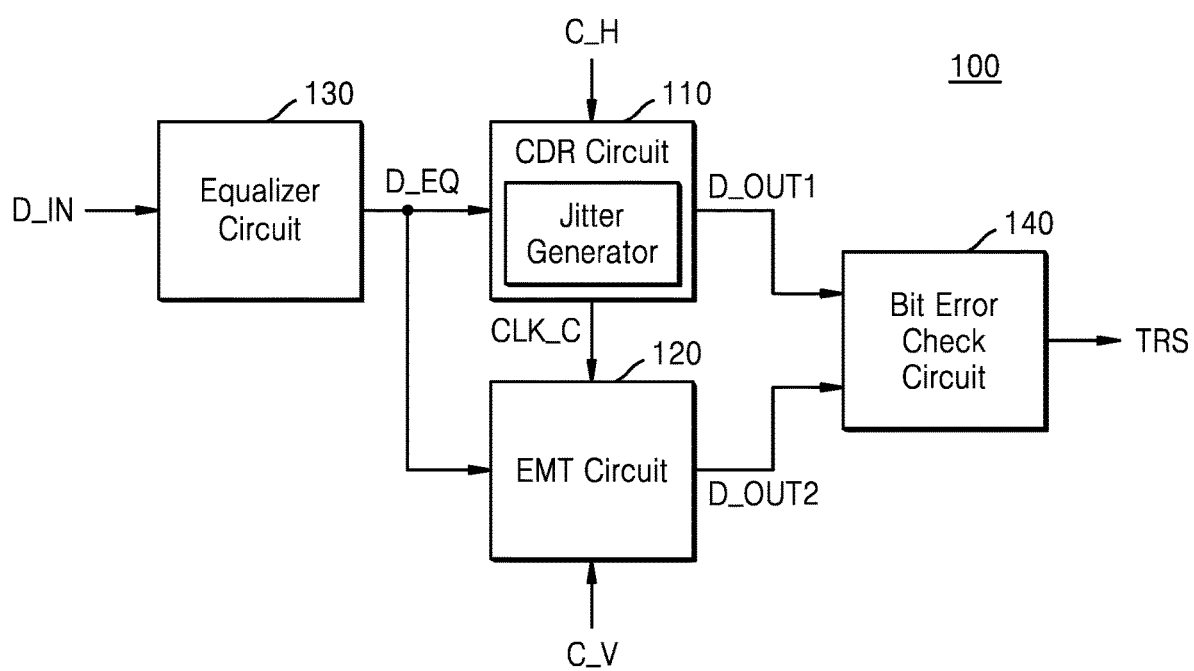
FIG. 2 is a block diagram of an interface circuit included in a display driving circuit according to an example embodiment.

Referring to FIG. 2, the interface circuit 100 may include a clock data recovery (CDR) circuit 110, an EMT circuit, an equalizer circuit 130 and a bit error check circuit (e.g., 120 of FIG. 2). The clock data recovery circuit 110 may recover a clock signal and data from the input data signal D_IN. The EMT circuit 120 may sample the data signal at the measurement point. Detailed configuration of the interface circuit 100 is described with reference to FIG. 2.

The display driving circuit 10 may provide the display signal SIG to the display panel 30 by processing the input data signal D_IN. The display signal SIG may be a signal to control pixels of the display panel 30 and may be a signal driving gate lines and data lines.

The display panel 30 may include a plurality of pixels. In an example embodiment, the display panel 30 may be an organic light-emitting diode (OLED) display panel in which each of pixels includes an OLED. However, the disclosure is not limited thereto, and the display panel 30 may be implemented as other types of flat displays or a flexible display panel.

FIG. 2 is a block diagram of an interface circuit included in a display driving circuit according to an example embodiment.

With reference to FIGS. 1 and 2, the interface circuit 100 may receive the input data signal D_IN in the EMT mode and output a test result signal TRS. The test result signal TRS may include information regarding an error bit rate generated at the measurement point.

The equalizer circuit 130 may receive the input data signal D_IN and generate a data signal D_EQ. The equalizer circuit 130 may compensate for signal distortion generated by response characteristics of a channel during transmission of the input data signal D_IN to the interface circuit 100 of the display driving circuit 10 from the interface circuit 200 of the timing controller 20 and generate the data signal D_EQ, which compensates for the distortion.

The CDR circuit 110 may receive the data signal D_EQ and output a clock signal CLK_C and a first output data signal D_OUT1. The CDR circuit 110 may generate the clock signal CLK_C based on the data signal D_EQ, sample the data signal D_EQ by using the clock signal CLK_C and generate the first output data signal D_OUT1 based on a sampling result.

The CDR circuit 110 may include a jitter generator configured to generate jitter of the clock signal CLK_C. The jitter generator of the CDR circuit 110 may adjust a jitter amplitude based on the horizontal control signal C_H. Moreover, the jitter generator may adjust a jitter frequency based on the horizontal control signal C_H. According to an example embodiment, the jitter generator of the CDR circuit 110 may adjust a jitter amplitude in response to the horizontal control signal C_H. Moreover, the jitter generator may adjust a jitter frequency in response to the horizontal control signal C_H.

The EMT circuit 120 may receive the clock signal CLK_C from the CDR circuit 110, sample the data signal D_EQ by using the clock signal CLK_C, and generate a second output data signal D_OUT2 based on a sampling result. The EMT circuit 120 may generate a vertical measurement voltage, which is a reference voltage level for a sampling operation, based on the vertical control signal C_V. According to an example embodiment, the EMT circuit 120 may generate a vertical measurement voltage, which is a reference voltage level for a sampling operation, in response to the vertical control signal C_V. The vertical measurement voltage and a jitter amplitude of the clock signal CLK_C corresponding to the vertical measurement voltage may be determined according to the measurement point. Examples of detailed configurations of the CDR circuit 110 and the EMT circuit 120 are described below with reference to FIG. 4.

The bit error check circuit 140 may receive the first output data signal D_OUT1 and the second output data signal D_OUT2 and output a test result signal TRS. The bit error check circuit 140 may compare the first output data signal D_OUT1 with the second output data signal D_OUT2 to calculate a bit error rate at the eye margin measurement point and output the test result signal TRS including the bit error rate information. In an example embodiment, the bit error check circuit 140 may be implemented as a digital circuit. For example, the bit error check circuit 140 may output a test result signal TRS indicating a fail state of the eye margin measurement operation when the bit error rate is greater than or equal to a reference value, and output a test result signal TRS indicating a pass state of the eye margin measurement operation when the bit error rate is less than the reference value. The display driving circuit 10 may generate an eye diagram of the data signal D_EQ based on the test result signal TRS. As the eye margin measurement operation is performed by using the jitter of the clock signal CLK_C, the eye diagram of the data signal D_EQ may be bilaterally symmetrical.

Figure 3A:
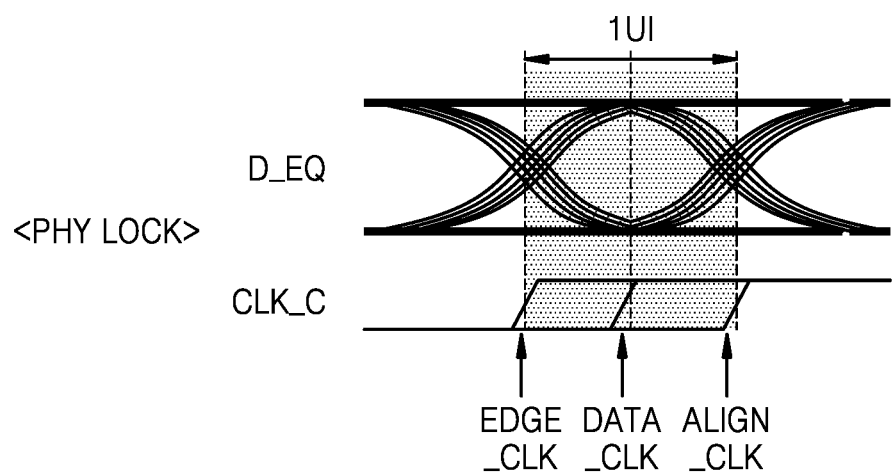
FIGS. 3A and 3B are diagrams illustrating a data signal and a clock signal.
Figure 3B:
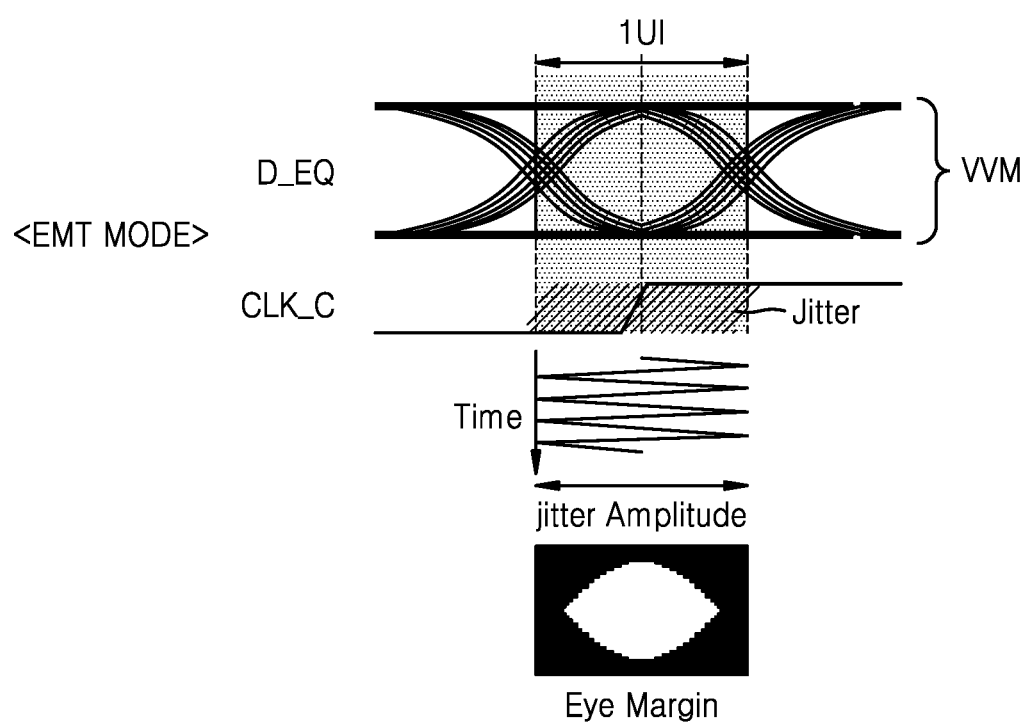

FIGS. 3A and 3B are diagrams illustrating a data signal and a clock signal. FIG. 3A is a diagram illustrating a physical lock operation by which the clock signal CLK_C is synchronized with the data signal D_EQ, and FIG. 3B is a diagram illustrating the eye margin measurement operation by which the clock signal CLK_C including jitter is generated.

With reference to FIGS. 2 and 3A, the CDR circuit 110 may generate the clock signal CLK_C synchronized with the data signal D_EQ. The synchronized clock signal CLK_C may include a data clock signal DATA_CLK and an edge clock signal EDGE_CLK. According to an example embodiment, the data clock signal DATA_CLK may be a signal generated at a middle point in one unit interval (UI) of the data signal D_EQ. For example, the data clock signal DATA_CLK may correspond to a signal when the level of the clock signal CLK_C is shifted at a middle point in one unit interval (UI) of the data signal D_EQ. According to an example embodiment, the edge clock signal EDGE_CLK may be a signal generated at a start point of the 1 UI. For example, the edge clock signal EDGE_CLK may correspond to a signal when the level of the clock signal CLK_C is shifted at a start point of the 1 UI. Furthermore, the clock signal CLK_C may include an align clock signal ALIGN_CLK, and the align clock signal ALIGN_CLK may be a signal generated based on the data clock signal DATA_CLK and the edge clock signal EDGE_CLK and may correspond to an end point of the 1 UI. The 1 UI may be a time interval corresponding to one bit and may be a minimum time interval between a state change of the data signal.

With reference to FIGS. 2 and 3B, the CDR circuit 110 may generate jitter based on the data clock signal DATA_CLK to perform the eye margin measurement operation on the data signal D_EQ At this time, the jitter amplitude of the jitter may be changed to correspond to a voltage level of each of the vertical measurement voltages VVM. For example, a jitter amplitude corresponding to a vertical measurement voltage VVM having a middle level between a high level and a low level of the data signal D_EQ may be greater than a jitter amplitude corresponding to a vertical measurement voltage VVM having the high level or the low level of the data signal D_EQ.

Figure 4:
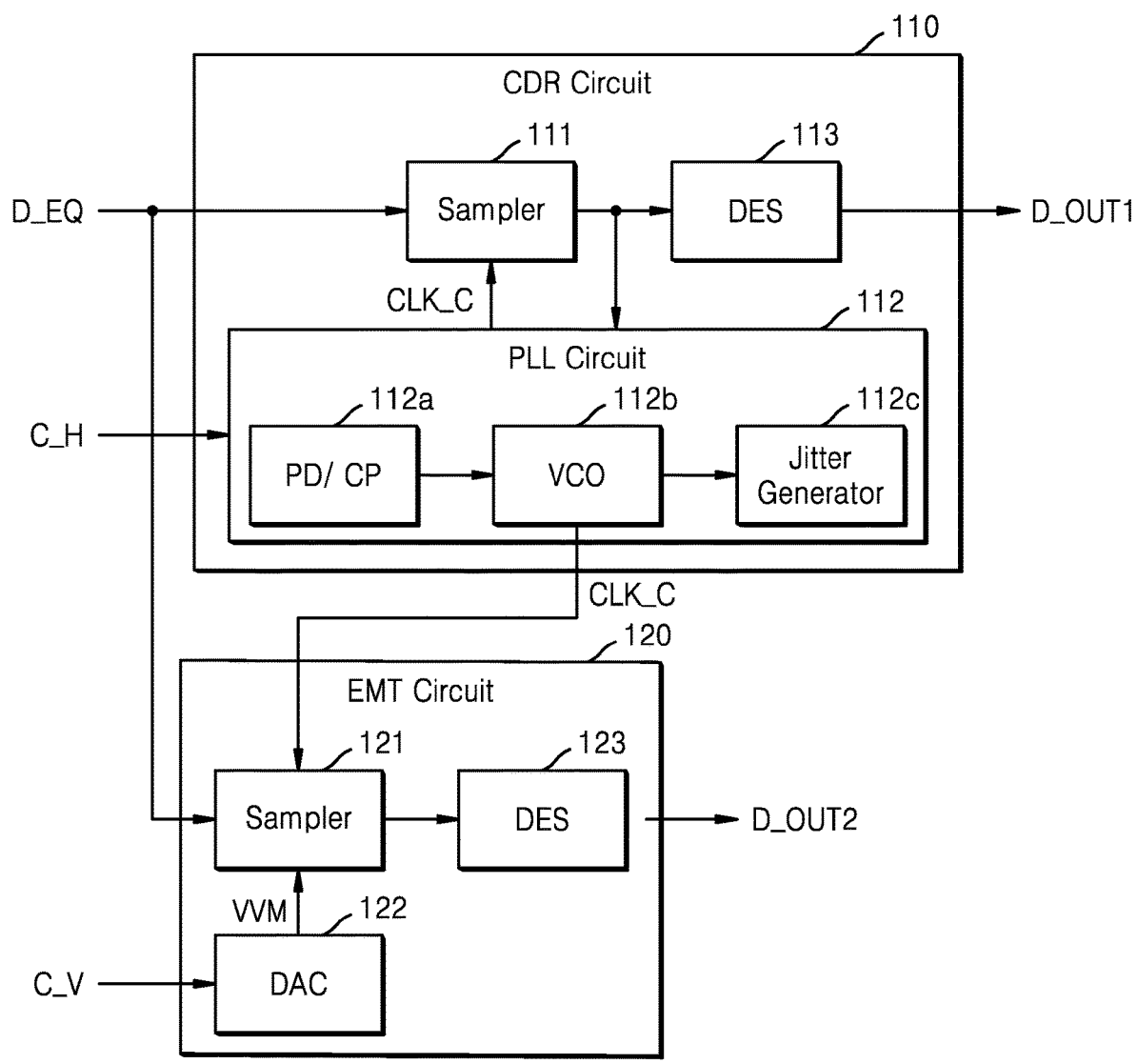
FIG. 4 is a block diagram of a clock data recovery (CDR) circuit and an eye margin test (EMT) circuit included in a display driving circuit according to an example embodiment.

FIG. 4 is a block diagram of a CDR circuit and an EMT circuit included in a display driving circuit according to an example embodiment.

With reference to FIG. 4, the CDR circuit 110 may include a sampler 111, a phase locked loop (PLL) circuit 112, a deserializer (DES) 113. The sampler 111 may sample the data signal D_EQ by using the clock signal CLK_C and generate a sample signal. The DES 113 may deserialize the sample signal and output the first output data signal D_OUT1.

The PLL circuit 112 may receive the sample signal output from the sampler 111 and generate the clock signal CLK_C synchronized with the data signal D_EQ. The clock signal CLK_C may include a data clock signal and an edge clock signal. The PLL circuit 112 may be a PLL-based CDR circuit.

The PLL circuit 112 may include a phase detector/charge pump (PD/CP) 112a, a voltage controlled oscillator (VCO) 112b, and a jitter generator 112c. In an example embodiment, the jitter generator 112c may be implemented by a frequency modulator.

The PD/CP 112a may detect a phase difference so that the clock signal CLK_C is synchronized with the data signal D_EQ and control the VCO 112b to reduce the phase difference. The VCO 112b may generate the clock signal CLK_C synchronized with the data signal D_EQ according to the control by the PD/CP 112a.

The jitter generator 112c may receive the clock signal CLK_C from the VCO 112b, and control the VCO 112b to generate jitter having a jitter amplitude and a jitter frequency according to the horizontal control signal C_H. The VCO 112b may generate the clock signal CLK_C including jitter according to the control by the jitter generator 112c.

The EMT circuit 120 may include a sampler 121, a digital-analog converter (DAC) 122, and a DES 123. The sampler 121 may receive the clock signal CLK_C from the PLL circuit 112, sample the data signal D_EQ by using the clock signal CLK_C, and generate a sample signal. The DES 113 may deserialize the sample signal and output the second output data signal D_OUT2.

The DAC 122 may generate the vertical measurement voltage VVM corresponding to the vertical control signal C_V. The DAC 122 may perform digital-analog conversion of the vertical control signal C_V and generate the vertical measurement voltage VVM. The sampler 121 may sample the data signal D_EQ based on the vertical measurement voltage VVM.

A display driving circuit according to the disclosure may improve measurement accuracy by measuring an eye margin of the data signal D_EQ inside the display driving circuit. In addition, in a comparative example where an eye margin of the data signal D_EQ is measured while shifting a phase of the clock signal CLK_C, an additional circuit (e.g., a phase interpolator, a low pass filter, a phase detector, etc.) is further required in addition to the EMT circuit to remove latency that occurred to the clock signal CLK_C, whereas as the eye margin of the data signal D_EQ is measured by using the jitter of the clock signal CLK_C in the disclosure, the configuration of the EMT circuit 120 may become simple. Accordingly, not only an area and power consumption of the EMT circuit 120 may be reduced, but also the eye margin measurement speed may become faster.

Figure 5:
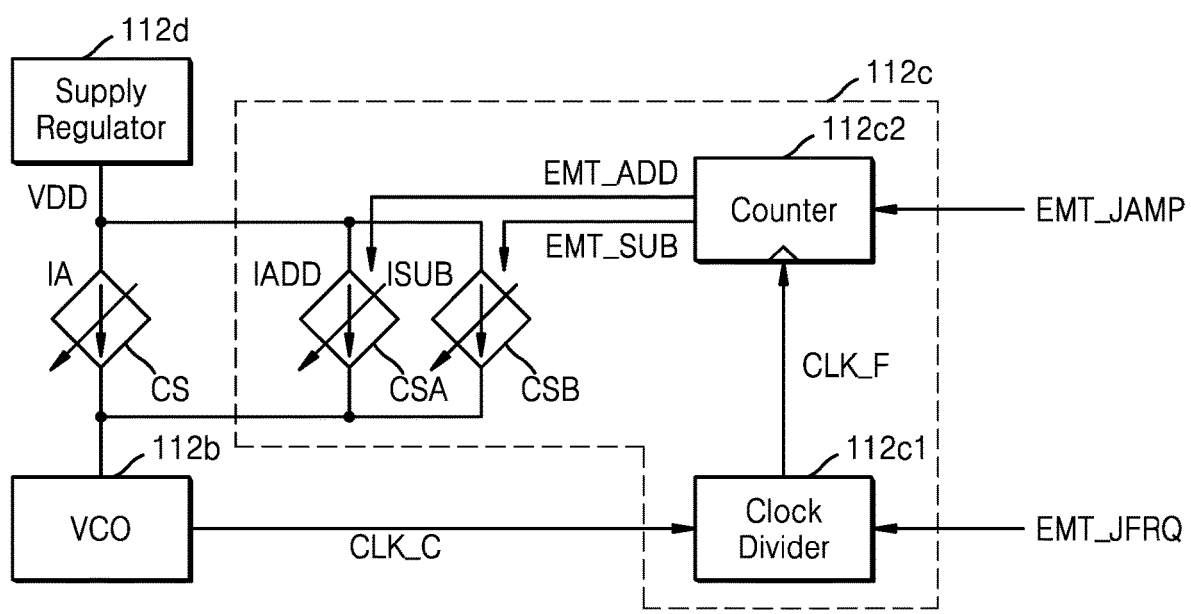
FIG. 5 is a block diagram of a jitter generator included in a display driving circuit according to an example embodiment.
Figure 6:
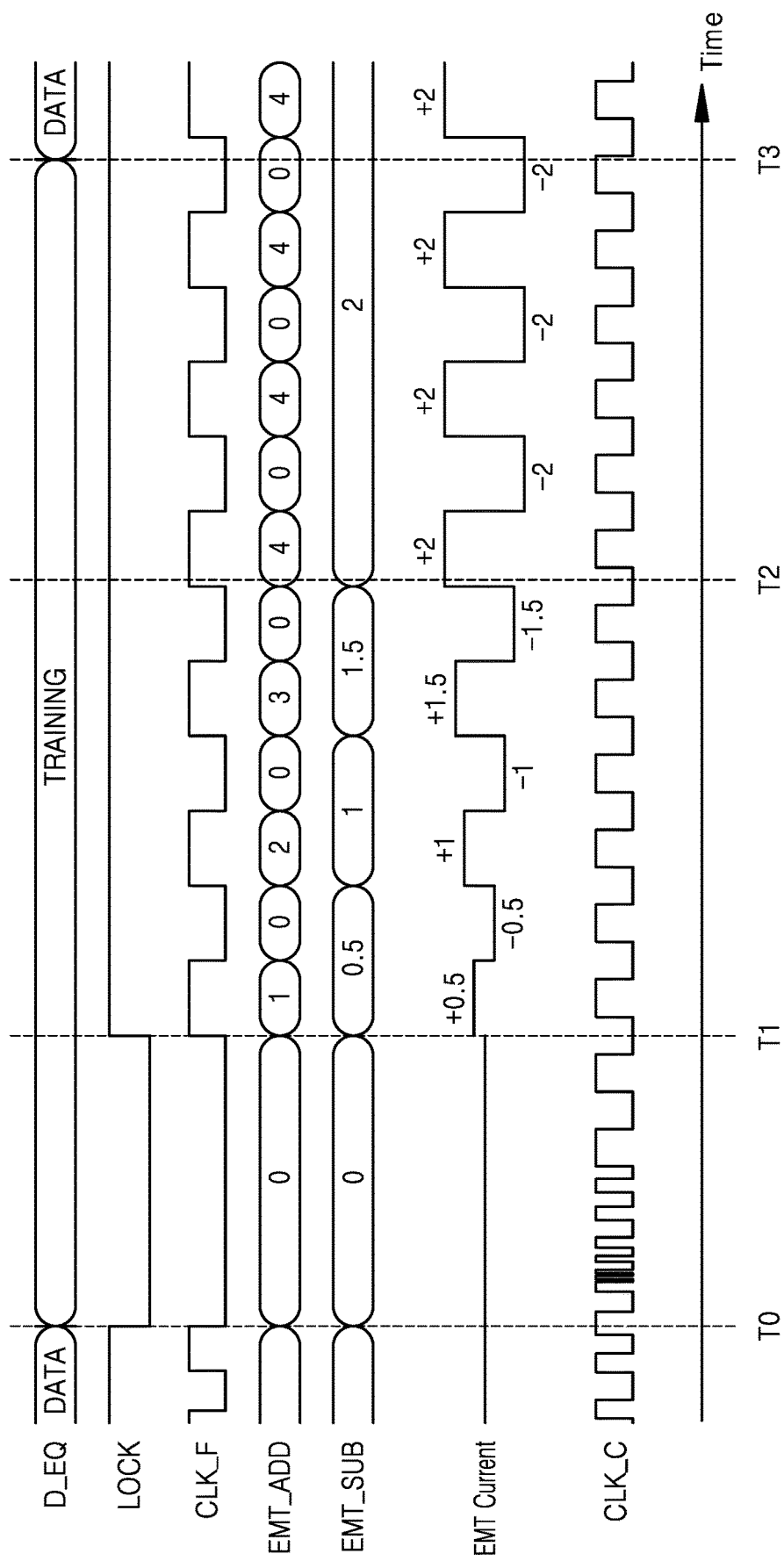
FIG. 6 is a timing chart illustrating signals input to or output from a jitter generator.

FIG. 5 is a block diagram of a jitter generator included in a display driving circuit according to an example embodiment. FIG. 6 is a timing chart illustrating signals input to or output from a jitter generator.

With reference to FIG. 5, the jitter generator 112c may be implemented by a frequency modulator. The jitter generator 112c may receive the clock signal CLK_C from the VCO 112b. The jitter generator 112c may include a clock divider 112c1 and a counter 112c2.

The clock divider 112c1 may determine a modulation frequency of the VCO 112b according to a frequency control signal EMT_JFRQ. The clock divider 112c1 may generate a frequency adjust clock signal CLK_F with varying frequency according to the frequency control signal EMT_JFRQ. For example, the clock divider 112c1 may generate the frequency adjust clock signal CLK_F to have a frequency greater than equal to a loop bandwidth of a CDR circuit (e.g., 110 of FIG. 4).

The counter 112c2 may determine a modulation ratio of the VCO 112b according to an amplitude control signal EMT_JAMP. The counter 112c2 may perform a counting operating by the frequency adjust clock signal CLK_F and generate a first current control signal EMT_ADD and a second current control signal EMT_SUB. The counter 112c2 may suspend the counting operation when the first current control signal EMT_ADD reaches the amplitude control signal EMT_JAMP. The counter 112c2 may generate the first current control signal EMT_ADD and the second current control signal EMT_SUB so that a change of current provided from the VCO 112b slowly reaches a peak value. The frequency control signal EMT_JFRQ and the amplitude control signal EMT_JAMP may be included in a horizontal control signal (e.g., C_H of FIG. 4) and may have a value set by a user.

The jitter generator 112c may include a first variable current source CSA and a second variable current source CSB. Each of the first variable current source CSA and the second variable current source CSB may adjust a level of a current provided to the VCO 112b. The first variable current source CSA may gradually increase the level of the current provided to the VCO 112b according to the first current control signal EMT_ADD, and the second variable current source CSB may gradually decrease the level of the current provided to the VCO 112b according to the second current control signal EMT_SUB.

The first variable current source CSA may adjust a level of a current IADD generated according to the first current control signal EMT_ADD, and the second variable current source CSB may adjust a level of a current ISUB generated according to the second current control signal EMT_SUB. In an example embodiment, the greater a value of the first current control signal EMT_ADD is, the greater the level of the current IADD of the first variable current source CSA may become, and the greater a value of the second current control signal EMT_SUB is, the less the level of the current ISUB of the second variable current source CSB may become.

The VCO 112b may adjust a frequency of the clock signal CLK_C according to the levels of the currents IA, IADD, and ISUB provided to the variable current sources CS, CSA, and CSB. In an example embodiment, the VCO 112b may include a ring oscillator, for example, a 5-stage ring oscillator, but the disclosure is not limited thereto. A power voltage VDD may be applied to the variable current sources CS, CSA, and CSB from a supply regulator 112d.

Accordingly, the jitter frequency of the clock signal CLK_C may be determined according to the frequency control signal EMT_JFRQ and the jitter amplitude of the clock signal CLK_C may be determined according to the amplitude control signal EMT_JAMP. For example, the jitter amount (Jitter$_{EMT}$) of the clock signal CLK_C may be calculated according to the following Equation 1.

$$\text{Jitter}_{EMT} \approx 2\pi f \text{EMT\_JAMP} \cdot \text{square}(2\pi t \cdot \text{EMT\_JFREQ}) dt \quad \text{[Equation 1]}$$

With reference to FIGS. 5 and 6, the CDR circuit and the EMT circuit may be reset at T0, and the data signal D_EQ of a training pattern may be received. At T0, a lock signal LOCK may be transitioned to logic low, and due to the physical lock, the CDR circuit may operate to generate a clock signal CLK_C synchronized with the data signal D_EQ. That is, the clock signal CLK_C including a data clock signal matched to the center of the 1 UI of the data signal D_EQ and an edge clock signal matched to the start point of the 1 UI may be generated.

At T0, the frequency adjust clock signal CLK_F may have a logic low level (e.g., 0). When the frequency adjust clock signal CLK_F has a logic low level, the first current control signal EMT_ADD may be generated such that the current IADD of the first variable current source CSA is 0 (e.g., has the value of 0). At T0, the second current control signal EMT_SUB may have the value of 0, and the current ISUB of the second variable current source CSB may have a maximum value due to the second current control signal EMT_SUB.

The counter 112c2 may generate the second current control signal EMT_SUB such that an average of a change of the current IADD of the first variable current source CSA and a change of the current ISUB of the second variable current source CSB is 0. The second variable current source CSB may generate the current ISUB according to the second current control signal EMT_SUB such that the average of the change of the current IADD of the first variable current source CSA and the change of the current ISUB of the second variable current source CSB is 0.

When the clock signal CLK_C is synchronized with the data signal D_EQ, the lock signal LOCK may be transitioned to logic high at T1 and an operation of generating jitter may be initiated. The frequency adjust clock signal CLK_F may be generated to have a particular frequency at T1.

The first current control signal EMT_ADD may increase sequentially by the frequency adjust clock signal CLK_F and may increase until the first current control signal EMT_ADD reaches the amplitude control signal EMT_JAMP. For example, the amplitude control signal EMT_ JAMP may have a value of 4, and the first current control signal EMT_ADD may be counted for every logic high section of the frequency adjust clock signal CLK_F until the first current control signal EMT_ADD has the value of 4. As the first current control signal EMT_ADD increases, the current IADD of the first variable current source CSA may increase in a logic high section of the frequency adjust clock signal CLK_F and return to the original state in a logic low section of the frequency adjust clock signal CLK_F.

The second current control signal EMT_SUB may increase by a half of the increment of the first current control signal EMT_ADD, regardless of the frequency adjust clock signal CLK_F. That is, the second current control signal EMT_SUB may be generated such that the current ISUB of the second variable current source CSB decreases by a half of the increment of the current IADD of the first variable current source CSA.

By the operation of the counter 112c2, the first current control signal EMT_ADD and the second current control signal EMT_SUB may slowly reach a value designated as the amplitude control signal EMT_JAMP instead of reaching the value at once. Accordingly, the interface circuit of the display driving circuit may not experience a loss of lock (LOL) due to the eye margin measurement operation.

An EMT current IADD+ISUB having a value obtained by adding the current IADD of the first variable current source CSA and the current ISUB of the second variable current source CSB may repeat an increase and a decrease according to the logic high and logic low. Accordingly, a frequency of the clock signal CLK_C generated by the VCO 112b, which has received the EMT current, may repeat an increase and a decrease, and the jitter may be generated in the clock signal CLK_C. For example, the jitter of the clock signal CLK_C may have a triangular profile.

At T2, the first current control signal EMT_ADD may reach the amplitude control signal EMT_JAMP, and the second current control signal EMT_SUB may reach a half value of the first current control signal EMT_ADD. The EMT current level change may reach a peak value. The clock signal CLK_C may include jitter having a jitter amplitude corresponding to the amplitude control signal EMT_JAMP.

At T3, the data signal D_EQ having a data value, which is not a training pattern, may be received. For example, the eye margin measurement operation may be performed on the data signal D_EQ at each eye margin measurement point by using the data signal D_EQ having a random pattern DATA and the clock signal CLK_C including jitter.

Figure 7:
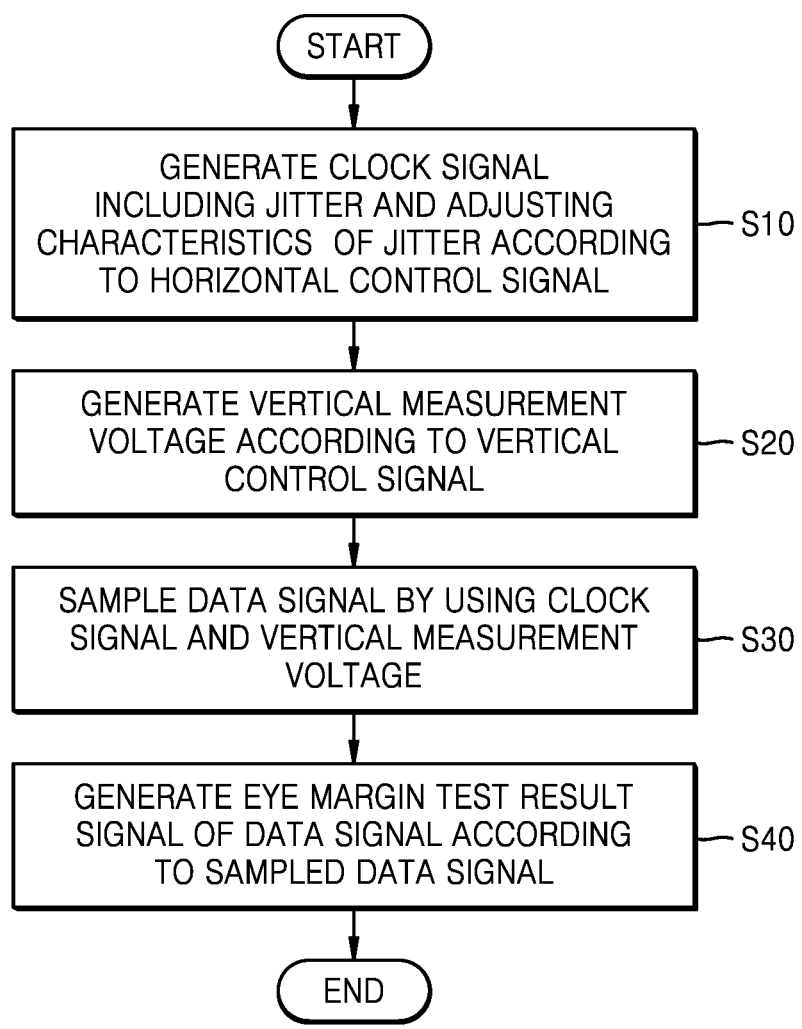
FIG. 7 is a flowchart of a method of operating a display driving circuit, according to an example embodiment.

FIG. 7 is a flowchart of a method of operating a display driving circuit, according to an example embodiment. For example, operations S10 to S40 of FIG. 7 may be performed at the interface circuit 100 of the display driving circuit 10 of FIG. 1, and may be operations performed in the EMT mode.

With reference to FIG. 7, in operation S10, characteristics of the jitter may be adjusted according to the horizontal control signal, and the clock signal including the jitter may be generated. For example, the characteristics of the jitter may refer to an amplitude and frequency of the jitter.

In operation S20, the vertical measurement voltage may be generated according to the vertical control signal. The vertical control signal and the horizontal control signal may be provided from the outside of the display driving circuit, and may be received from, for example, the timing controller (e.g., 20 of FIG. 1). The vertical measurement voltage and the jitter amplitude may be determined at each eye margin measurement point. Accordingly, the vertical measurement voltage may correspond to the jitter amplitude of the clock signal.

In operation S30, the data signal may be sampled by using the clock signal and the vertical measurement voltage, and in operation S40, an EMT result signal of the data signal may be generated according to sampled data signal. The display driving circuit may measure a bit error rate of the data signal according to the sample signal, determine that the eye margin of the data signal is not sufficient (fail state) when the bit error rate is greater than or equal to a reference value, and determine that the eye margin of the data signal is sufficient (pass state) when the bit error rate is less than the reference value.

Operations S10 to S40 may be repeated at each of a plurality of eye margin measurement points to perform the eye margin measurement operation with respect to each of the plurality of eye margin measurement points. The display driving circuit may determine that the eye margin of the data signal is sufficient when the eye margin of the data signal is sufficient at all of the plurality of eye margin measurement points. On the contrary, the display driving circuit may determine that the eye margin of the data signal is not sufficient when the eye margin of the data signal is not sufficient at least one of the plurality of eye margin measurement points.

Figure 8:
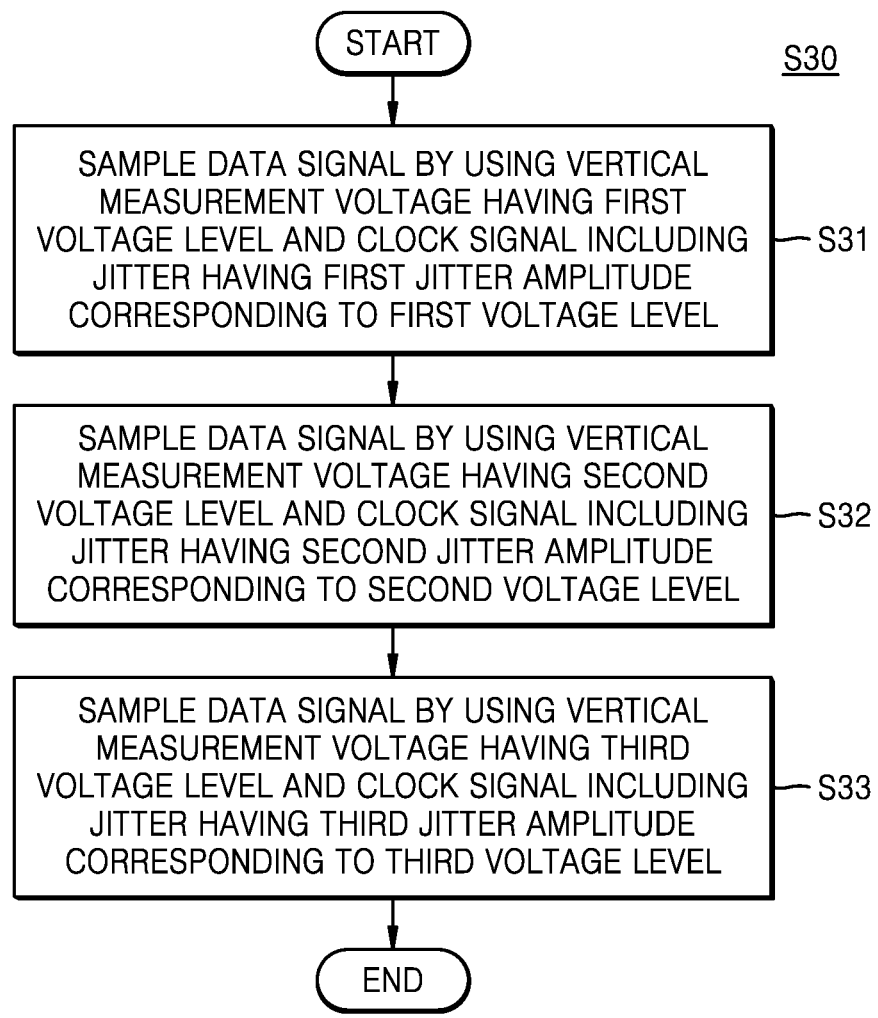
FIG. 8 is a flowchart of a method of operating a display driving circuit, according to an example embodiment.

FIG. 8 is a flowchart of a method of operating a display driving circuit, according to an example embodiment. FIGS. 9A to 9D are diagrams illustrating a clock signal and a vertical measurement voltage at a measurement point. Operation S30 of FIG. 8 may be an example of operation S30 of FIG. 7 and may include operations S31 to S33.

Figure 9A:
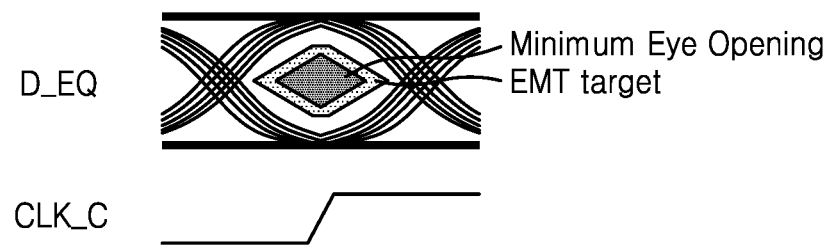
FIGS. 9A to 9D are diagrams illustrating a clock signal and a vertical measurement voltage at a measurement point.

FIG. 9A illustrates the data signal D_EQ and the clock signal CLK_C before the EMT circuit is activated according to an example embodiment. For example, FIG. 9A illustrates the data signal D_EQ and the clock signal CLK_C before the jitter is generated in the clock signal CLK_C. The clock signal CLK may be synchronized with the data signal D_EQ by the CDR circuit.

At this time, a minimum value of an eye opening of the data signal D_EQ may be set. The minimum value of the eye opening may be set by the specification of the display driving circuit. Moreover, an EMT target of the eye opening having a value obtained by adding a constant offset to the minimum value of the eye opening may be set. That is, the EMT target may be set wider than the minimum value of the eye opening. The margin measurement operation may determine the pass or fail state based on the EMT target. When the margin measurement operation is commenced, triangular jitter may occur in the clock signal CLK_C, and the pass/fail of the margin measurement operation may be determined according to the level of the jitter amplitude and the eye opening value of the data signal D_EQ.

Figure 9B:
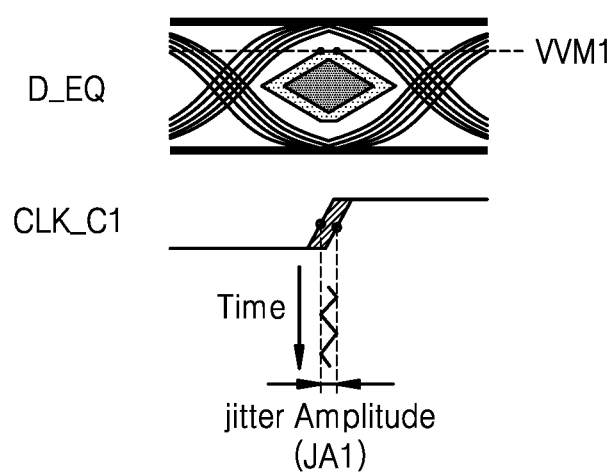

With reference to FIGS. 8 and 9B, the upper measurement point of the EMT target may be set as the first measurement point. In operation S31, the data signal D_EQ may be sampled by using a vertical measurement voltage VVM1 having a first voltage level and a clock signal CLC_C1 including jitter having a first jitter amplitude JA1 corresponding to the first voltage level.

Figure 9C:
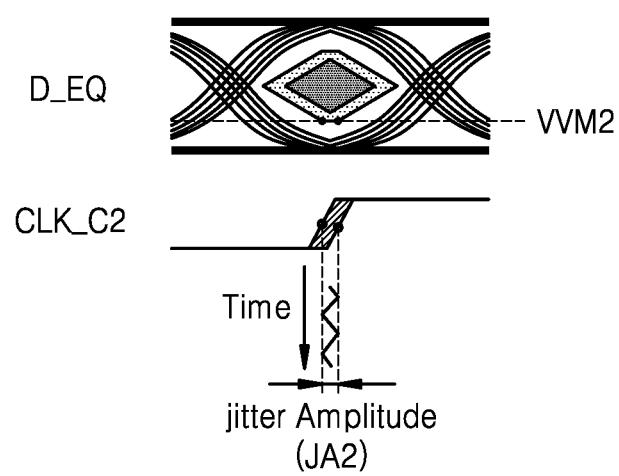

With reference to FIGS. 8 and 9C, the lower measurement point of the EMT target may be set as the second measurement point. In operation S32, the data signal D_EQ may be sampled by using a vertical measurement voltage VVM2 having a second voltage level and a clock signal CLC_C2 including jitter having a second jitter amplitude JA2 corresponding to the second voltage level.

Figure 9D:
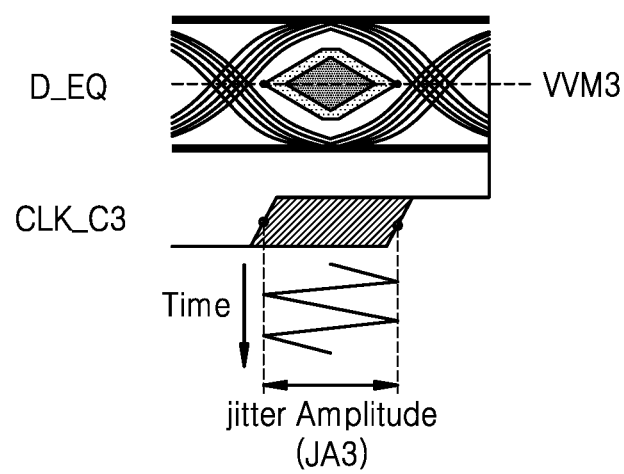

With reference to FIGS. 8 and 9D, the middle measurement point of the EMT target may be set as the third measurement point. In an example embodiment, the middle measurement point may be a point having the longest horizontal width in an eye diagram of the data signal D_EQ.

In operation S33, the data signal D_EQ may be sampled by using a vertical measurement voltage VVM3 having a third voltage level and a clock signal CLC_C3 including jitter having a third jitter amplitude JA3 corresponding to the third voltage level.

The display driving circuit according to the disclosure may repeatedly perform the margin measurement operation at each of the upper measurement point, the lower measurement point, and the middle measurement point, and determine the pass/fail state concerning the sufficiency of eye margin of the data signal D_EQ at a high speed to generate an EMT result signal. Alternatively, the display driving circuit may repeatedly perform the eye margin measurement operation by slightly moving an eye mask from the upper measurement point to the lower measurement point, and generate the test result signal so that the user may draw an eye diagram of the data signal D_EQ.

Figure 10:
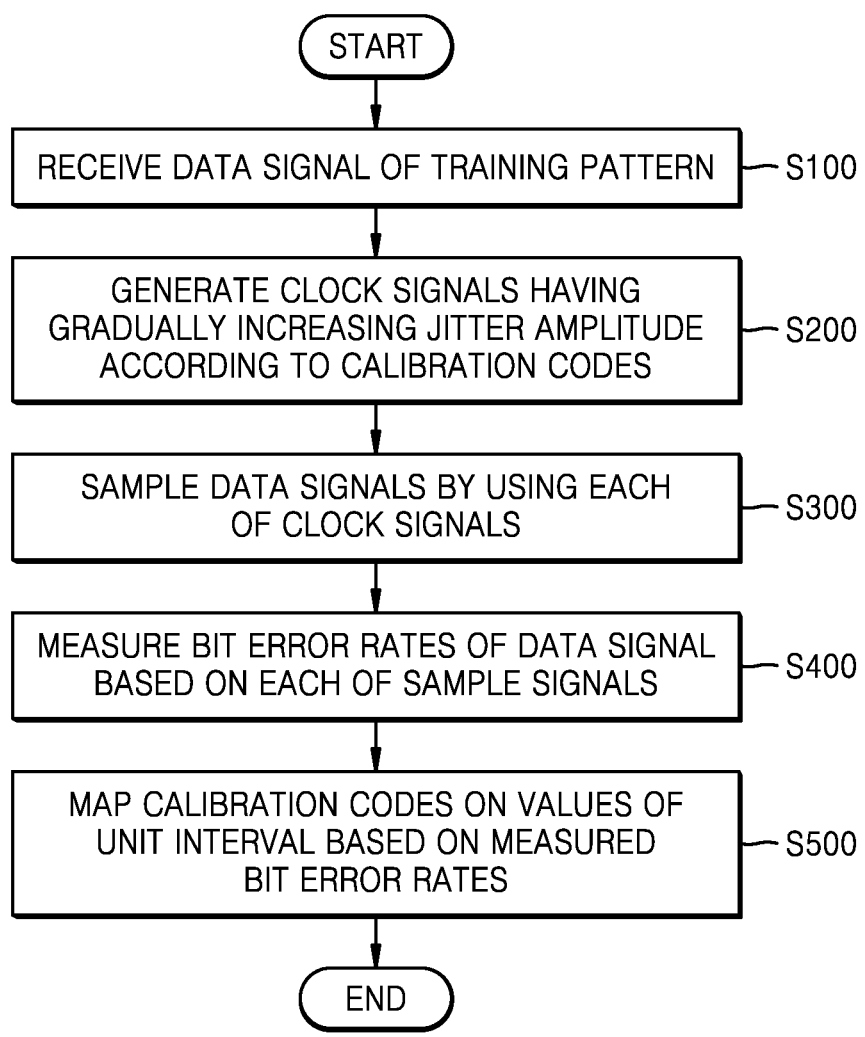
FIG. 10 is a flowchart of a method of operating a display driving circuit, according to an example embodiment.
Figure 11:
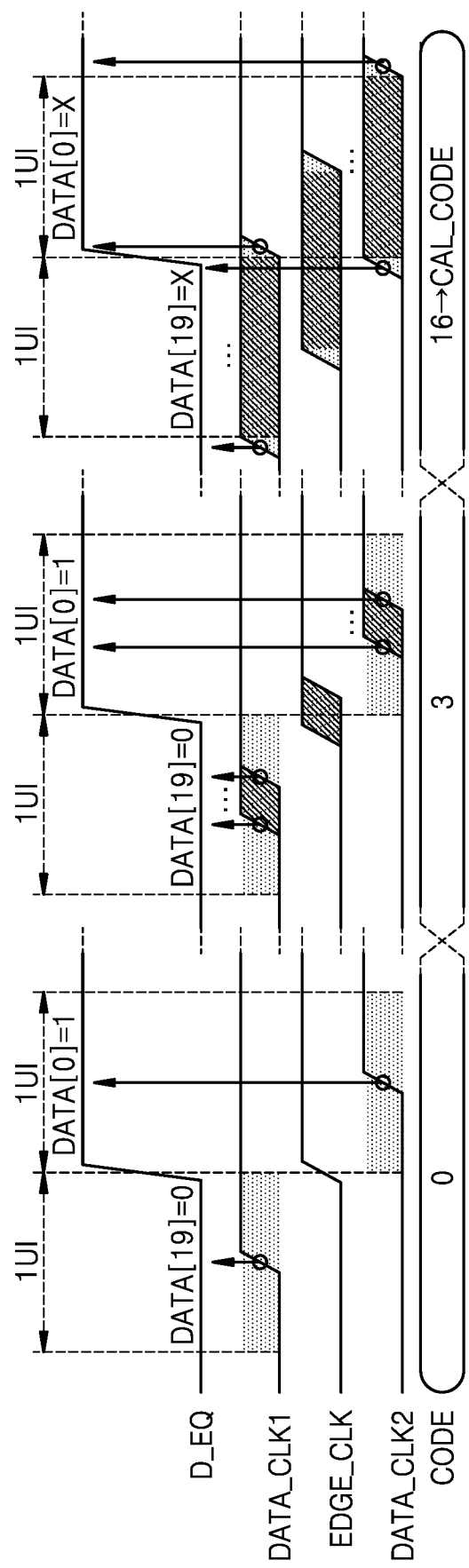
FIG. 11 is a timing chart illustrating a calibration operation of FIG. 10.
Figure 12:
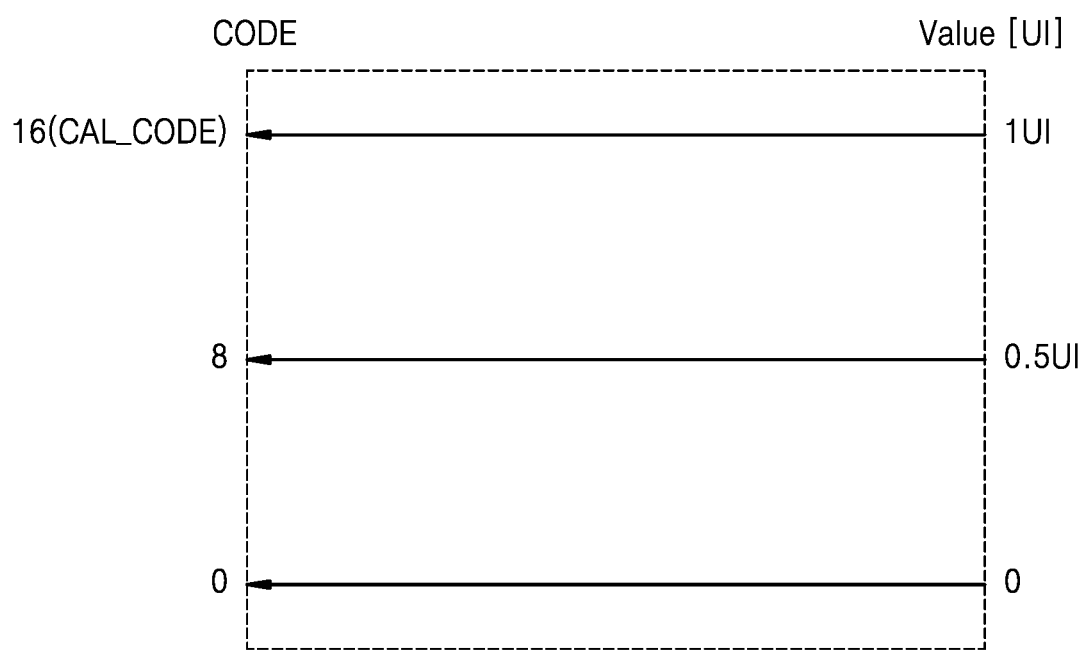
FIG. 12 is a diagram illustrating a mapping table generated by performing a calibration operation.

FIG. 10 is a flowchart of a method of operating a display driving circuit, according to an example embodiment, and illustrates a calibration operation. FIG. 11 is a timing chart illustrating the calibration operation of FIG. 10, and FIG. 12 is a diagram illustrating a mapping table generated by performing the calibration operation. In an example embodiment, operations S100 to S400 of FIG. 10 may be performed prior to operation S10 of FIG. 7.

With reference to FIGS. 10 and 11, in operation S100, the data signal D_EQ of a training pattern may be received. In an example embodiment, the training pattern may regularly repeat 111111-0000-1111-000000 to reduce intersymbol interference (ISI). However, the disclosure is not limited thereto, and as such, according to another example embodiment, other training patters may be provided.

In operation S200, clock signals having a jitter amplitude sequentially increasing according to calibration code CODE may be generated. According to an example embodiment, the clock signals may be a first data clock signal DATA_CLK1, an edge clock signal EDGE_CLK, and a second data clock signal DATA_CLK2. The first data clock signal DATA_CLK1 may be synchronized in the middle of DATA [19] where the data value is 0, and the second data clock signal DATA_CLK2 may be synchronized in the middle of DATA[0] where the data value is 1. The edge clock signal EDGE_CLK may be synchronized at an edge time point when transitioning from DATA[19] to DATA[0].

The calibration codes CODE may be increased at regular time intervals (e.g., 65 μs time interval). For example, the calibration codes CODE may be sequentially increased from 0 to 16. The calibration codes CODE may be provided to the jitter generator (e.g., 112c2 of FIG. 5) as the amplitude control signal (e.g., EMT_JAMP of FIG. 5). However, unlike the amplitude control signal EMT_JAMP illustrated in FIG. 5, the calibration codes CODE may be a signal according to register setting inside the display circuit, separate from the timing controller.

In operation S300, the data signal D_EQ may be sampled by using each of the clock signals, (i.e., the first data clock signal DATA_CLK1, the edge clock signal EDGE_CLK, and the second data clock signal DATA_CLK2), and in operation S400, the bit error rate of the data signal D_EQ may be measured based on each of the sampled data signals. That is, whether the data values of DATA[19] and DATA[0] may respectively remain at 0 and 1 may be confirmed. When the jitter of the first data clock signal DATA_CLK1, the edge clock signal EDGE_CLK, and the second data clock signal DATA_CLK2 exceeds 1 UI, the data values of DATA[19] and DATA[0] may not be 0 and 1, respectively, and be changed to a value X other than 0 and 1.

With reference to FIGS. 10 and 12, in operation S400, the calibration codes CODE may be mapped on the values of the UI based on the measured bit error rates. The calibration code CODE, in which a bit error is first generated, may be set as a reference calibration code CAL_CODE for the mapping on the 1 UI. For example, the calibration code CODE 16 may be the reference calibration code CAL_CODE mapped on the 1 UI, the calibration code CODE 8 may be mapped on 0.5 UI, and the calibration code CODE 0 may be mapped on 0 UI. The result of such mapping may be stored in the display driving circuit in the form of a mapping table. Accordingly, when the jitter of the first data clock signal DATA_CLK1, the edge clock signal EDGE_CLK, and the second data clock signal DATA_CLK2 is generated by the reference calibration code CAL_CODE, the jitter may be 1 UI, and the jitter of the first data clock signal DATA_CLK1, the edge clock signal EDGE_CLK, and the second data clock signal DATA_CLK2 generated by the calibration code CODE having a half value of the reference calibration code CAL_CODE may be 0.5 UI.

The eye margin measurement operation may be performed according to the mapping table, which is the result of the calibration operation. The maximum value of a horizontal control signal EMT_JAMP received from the timing controller according to the mapping table may be set as 1 UI, and the clock signal CLK_C including jitter for measuring the eye margin may be generated. By performing the calibration operation, the jitter resolution of the clock signal CLK_C with respect to the amplitude control signal EMT_JAMP may remain constant, and the display driving circuit may have a reduced performance variation due to changes in a manufacturing process of the display driving circuit, a voltage driving the display driving circuit, and a temperature.

Figure 13:
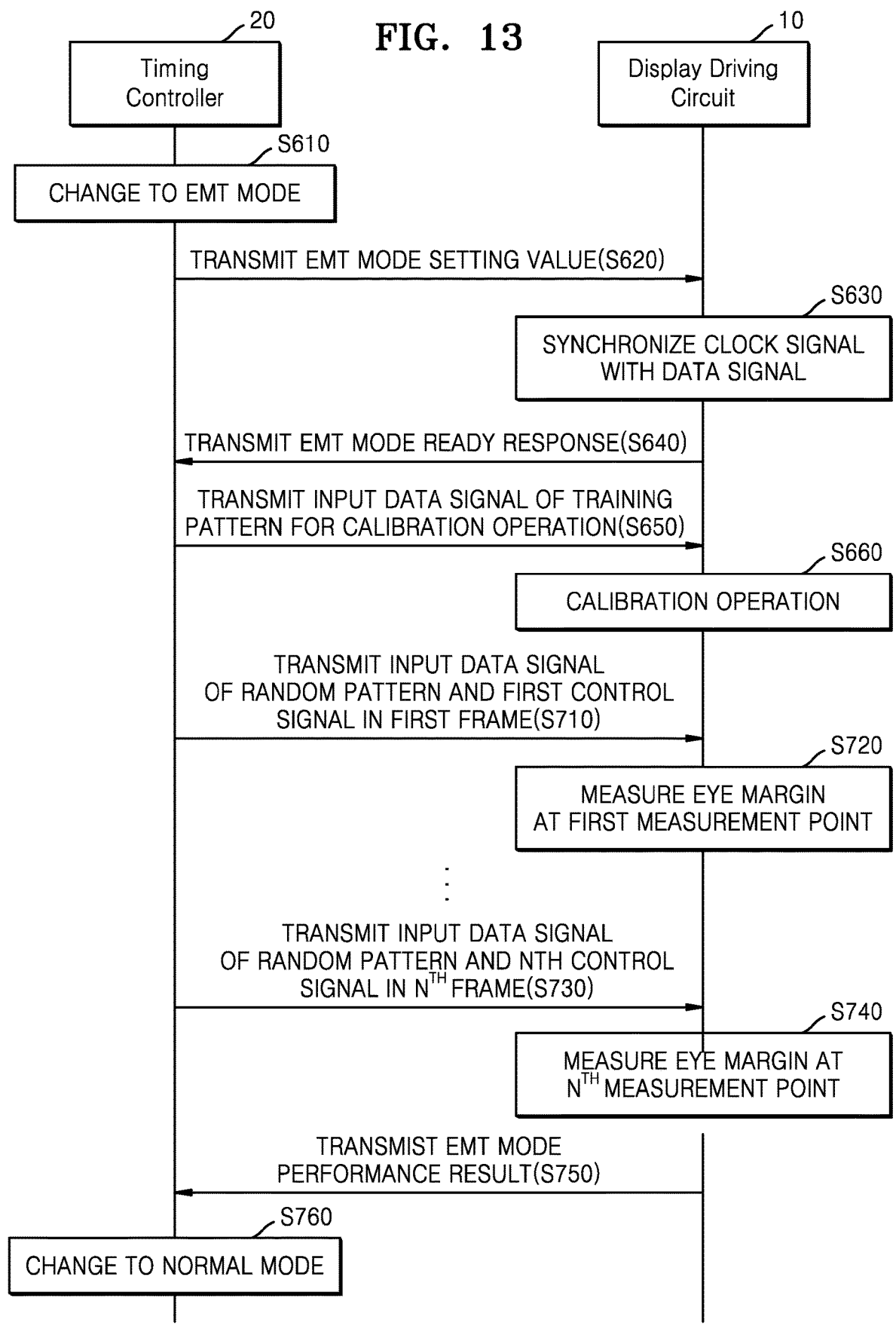
FIG. 13 is a flowchart of a method of operating a display driving device, according to an example embodiment.

FIG. 13 is a flowchart of a method of operating a display driving device according to an example embodiment. FIG. 13 illustrates the EMT mode operations of the display device.

With reference to FIG. 13, the timing controller 20 may change from the normal mode to the EMT mode (S610) and may transmit an EMT mode setting value for performing the EMT mode to the display driving circuit 10 (S620). In addition, the timing controller 20 may transmit the EMT mode setting value together with a signal instructing the commencement of the EMT mode. The EMT mode setting value may include setting values for performing the EMT mode, such as a threshold value for determining the pass/fail state of the EMT mode from the bit error rate, and information regarding a vertical offset and a horizontal offset for measuring the eye margin of the data signal.

The display driving circuit 10 may synchronize the clock signal with the data signal (S630). That is, the data clock signal and the edge clock signal synchronized with the data signal may be generated. It may be referred to as the physical lock operation.

When the preparation for performing the EMT mode operations is completed, the display driving circuit 10 may transmit an EMT mode ready response to the timing controller 20 (S640), the timing controller 20 may transmit the input data signal of a training pattern for the calibration operation to the display driving circuit 10 (S650). For example, the timing controller 20 may transmit the input data signal of a training pattern together with a signal instructing 128 toggles in one frame.

The display driving circuit 10 may perform the calibration operation (S660). The calibration operation may include, for example, operations S100 to S500 described with reference to FIG. 10. The resolution of jitter with respect to the code value of the amplitude control signal (e.g., EMT_JAMP of FIG. 5) may remain constant due to the calibration operation.

To perform the eye margin measurement operation, the timing controller 20 may transmit an input data signal of a random pattern and a first control signal in the first frame (S710), and the display driving circuit 10 may measure the eye margin at the first measurement point (S720). The first measurement point may be determined according to the first control signal. The first control signal may include the vertical control signal and the horizontal control signal.

Moreover, the timing controller 20 may transmit an input data signal of a random pattern and an $n^{th}$ control signal in an $n^{th}$ frame (S730), and the display driving circuit 10 may measure the eye margin at an $n^{th}$ measurement point (S720). The $n^{th}$ measurement point may be determined according to the $n^{th}$ control signal. According to an example embodiment, n may be a natural number greater than or equal to 2. The $n^{th}$ control signal may include the vertical control signal and the horizontal control signal. To improve eye margin measurement accuracy in the EMT mode, the input data signal may have a random pattern in the first to $n^{th}$ frames.

In an example embodiment, the first to $n^{th}$ measurement points may include the upper measurement point, the lower measurement point, and the middle measurement point described with reference to FIG. 9B to 9D, and may further include a preliminary measurement point. However, the disclosure is not limited thereto, and the first to $n^{th}$ measurement point may be modified in various ways.

The display driving circuit 10 may transmit the result of performing the EMT mode to the timing controller 20 (S750). In an example embodiment, the display driving circuit 10 may store the EMT mode performance result in the display driving circuit 10, and the timing controller 20 may read the EMT mode performance result stored in the display driving circuit 10 by providing a separate command. For example, when the eye margin measurement operation is in the fail state at at least one of the first to $n^{th}$ measurement points, the display driving circuit 10 may transmit the fail state to the timing controller 20. When the eye margin measurement operation is in the pass state at each of the first to $n^{th}$ measurement points, the display driving circuit 10 may transmit the pass state to the timing controller 20.

When the EMT mode is finished, the timing controller 20 may be change from the EMT mode to the normal mode (S760). When the EMT mode performance result is received, the timing controller 20 may convert the EMT mode to the normal mode. The timing controller 20 may transmit display data to the display driving circuit 10 in the normal mode.

Figure 14:
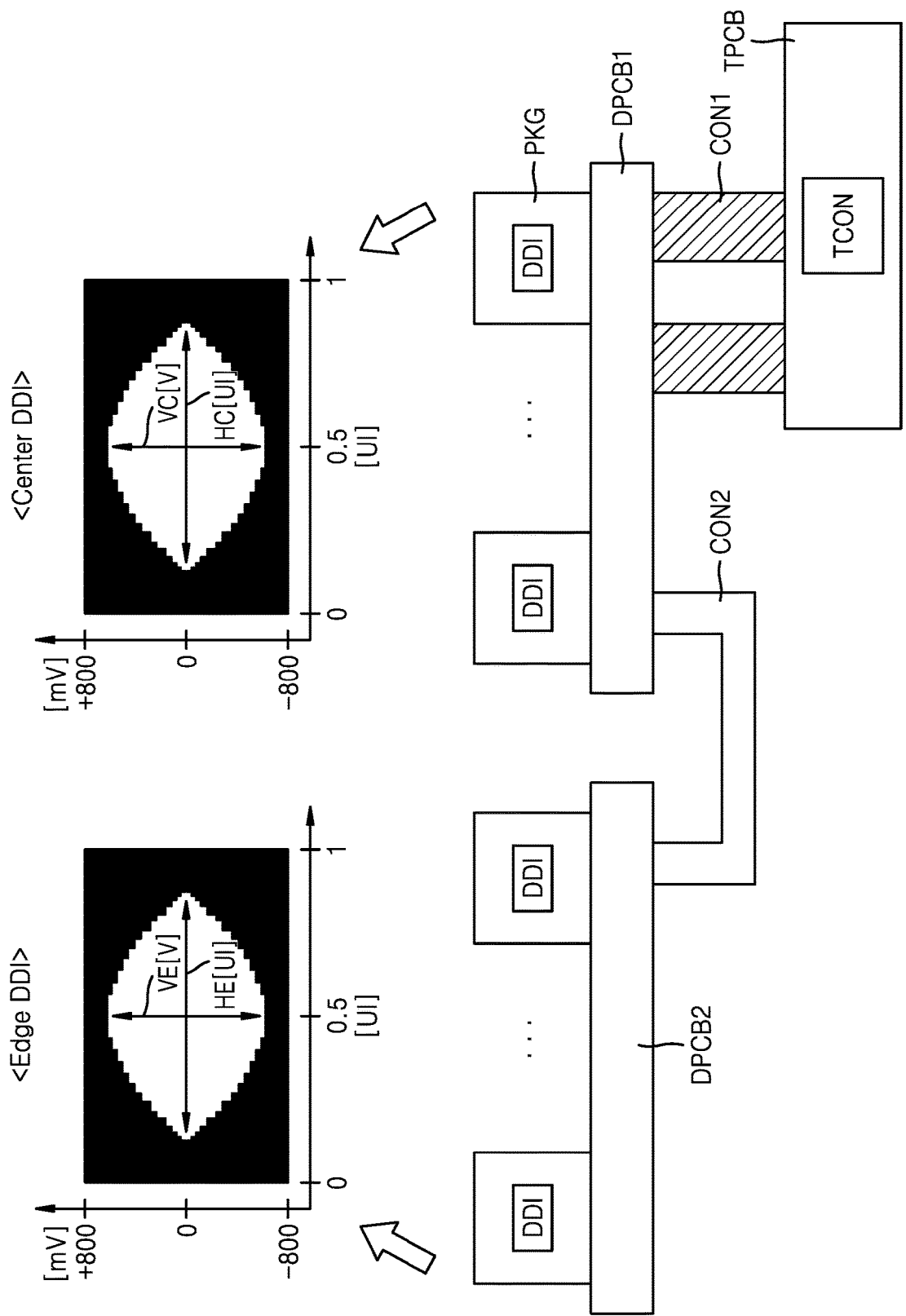
FIG. 14 is a diagram of a display device according to an example embodiment.

FIG. 14 is a diagram of a display device according to an example embodiment.

With reference to FIG. 14, the display device may include a timing controller TCON and a plurality of display driving circuits (DDIs). Each of the plurality of DDIs may receive an input data signal (e.g., D_IN of FIG. 1) and the control signal C_S from the timing controller TCON.

For example, a center DDI arranged relatively close to the timing controller TCON may receive the input data signal D_IN through a printed circuit board TPCB, on which the timing controller TCON is mounted, a first connector CON1, a first printed circuit board DPCB1, on which a package including the center DDI is mounted, and the package PKG, on which the center DDI is mounted. The first connector CON1 may be a connecting member configured to receive and transmit a signal between the printed circuit board TPCB and the first printed circuit board DPCB1, and the package PKG may be a film.

On the other hand, an edge DDI arranged relatively far from the timing controller TCON may receive the input data signal D_IN through the printed circuit board TPCB, on which the timing controller TCON is mounted, the first connector CON1, the first printed circuit board DPCB1, a second connector CON2, a second printed circuit board DPCB2, on which a package including the edge DDI is mounted, and the package PKG, on which the edge DDI is mounted. The second connector CON2 may be a connecting member configured to receive and transmit a signal between the first printed circuit board DPCB1 and the second printed circuit board DPCB2. However, unlike the description of FIG. 14, the center DDI and the edge DDI may be mounted on the same printed circuit board.

Compared to the center DDI, the edge DDI may have a longer channel (e.g., CH of FIG. 1) providing the input data signal D_IN from the timing controller TCON. Accordingly, the eye margin of the data signal may be relatively small. That is, a horizontal width HE[UI] of the eye at the edge DDI may be less than a horizontal width HC[UI] of the eye at the center DDI, and a vertical width VE[V] of the eye at the edge DDI may be less than a vertical width VC[V] of the eye at the center DDI. Accordingly, in an example embodiment, the display device may choose a DDI having a long channel connected to the timing controller TCON, among the plurality of DDIs, and perform the EMT mode. However, the disclosure is not limited thereto, and the display device may perform the EMT mode with respect to all DDIs.

Figure 15:
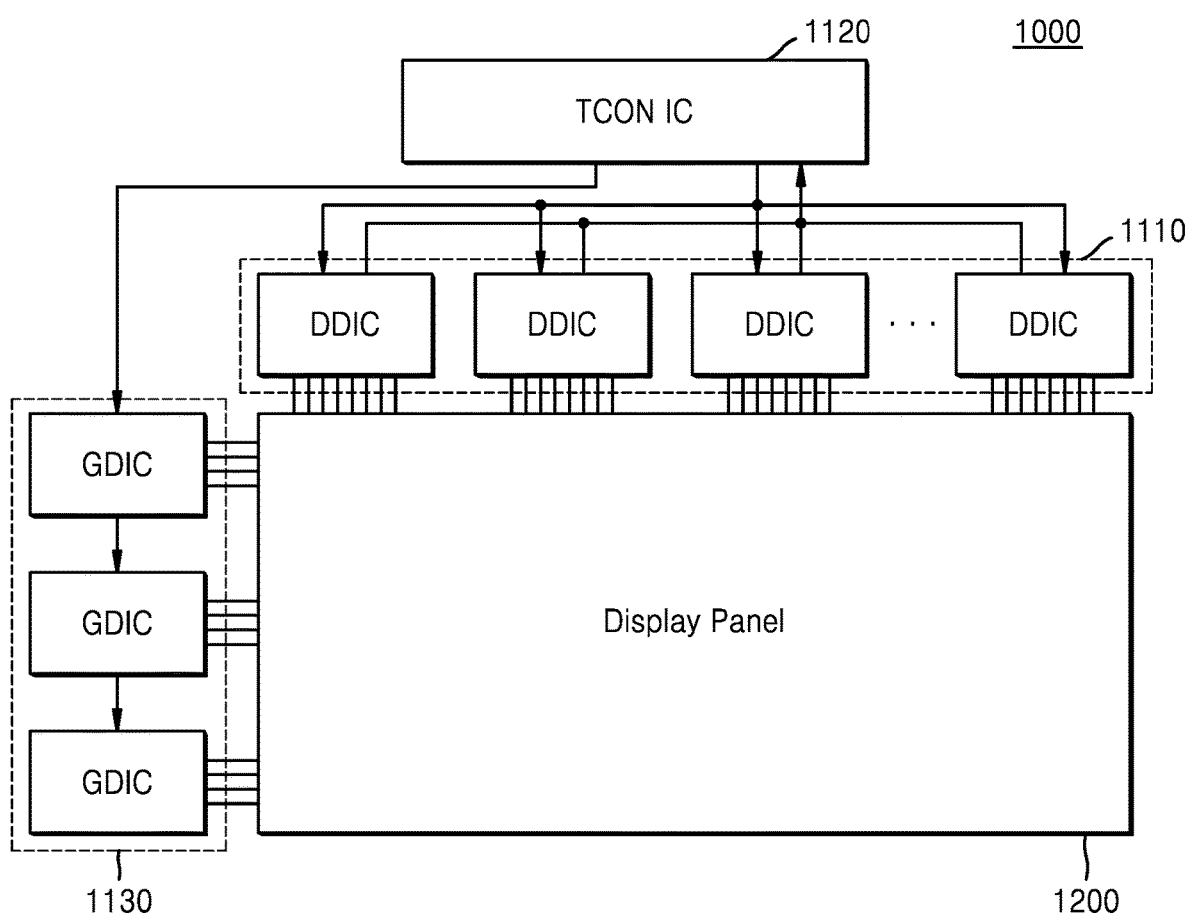
FIG. 15 is a diagram illustrating an implementation example of a display device according to an example embodiment.

FIG. 15 is a diagram illustrating an implementation example of a display device according to an example embodiment. The display device of FIG. 15 may be a device including a medium and large display panel 1200 and may be applied to, for example, a television, a monitor, etc.

With reference to FIG. 15, a display device 1000 may include a data driver 1110, a timing controller 1120, a gate driver 1130, and the display panel 1200.

The timing controller (TCON IC) 1120 may be constituted by one or more ICs or modules. The timing controller 1120 may communicate with a plurality of data driving ICs (DDICs) and a plurality of gate driving ICs (GDICs) through a set interface.

The timing controller 1120 may generate control signals controlling the driving timing of the plurality of DDICs and the plurality of GDICs and provide the control signals to the plurality of DDICs and the plurality of GDICs.

The timing controller 1120 may divide image data received from the outside and provide the divided pieces of data to each of the plurality of DDICs. The timing controller 1120 may perform the EMT mode. As described with reference to FIG. 13, the timing controller 1120 may transmit the EMT mode setting value to each of the plurality of DDICs, and transmit the data signal of training pattern for performing the EMT mode operations and first to $n^{th}$ data signals of random pattern to each of the DDICs. The timing controller 1120 may receive the EMT mode performance result from each of the plurality of DDICs.

The data driver 1110 may include a plurality of DDICs, and the plurality of DDICs may be mounted on a circuit film such as a TCP, a COF, a FPC, etc. and be attached to the display panel 1200 in a TAB manner, or may be mounted on a non-display are of the display panel 1200 in a COG manner. Each of the plurality of DDICs may perform the eye margin measurement operation of the display driving circuit in the EMT mode, described with reference to FIGS. 1 to 14.

The gate driver 1130 may include a plurality of GDICs, and the plurality of GDICs may be mounted on a circuit film and be attached to the display panel 1200 in a TAB manner, or may be mounted on a non-display are of the display panel 1200 in a COG manner. Alternatively, the gate driver 1130 may be directly formed on a lower substrate of the display panel 1200 in a gate-driver in panel (GIP) manner. The gate driver 1130 may be formed in a non-display area outside the pixel array in which pixels PX are formed in the display panel 1200 and may be formed by a thin film transistor (TFT) process as in the formation of the pixels.

The embodiments are described in the specification and drawings. Although particular terms are used to describe the embodiments in the specification, such terms are intended to describe the technical ideas of the disclosure and are not used to pose a limitation on the scope of the claims of the disclosure. It will be understood by those of ordinary skill in the art that various changes and equivalent embodiments may be made from the embodiments of the disclosure. Therefore, the true scope of protection of the disclosure should be defined by the appended claims.

While the disclosure has been particularly shown and described with reference to embodiments thereof, it will be understood that various changes in form and details may be made therein without departing from the spirit and scope of the following claims.

What is claimed is:

1. A display driving circuit comprising:
   a clock data recovery circuit configured to:
      receive a data signal, and
      generate a clock signal and a first output data signal, the clock data recovery circuit comprising a jitter generator configured to generate jitter of the clock signal and vary an amplitude the jitter according to a horizontal control signal;
   an eye margin test circuit configured to:
      sample the data signal by using the clock signal, based on a vertical measurement voltage, and
      generate a second output data signal based on the sampled data signal; and
   a bit error check circuit configured to measure a bit error rate of the data signal, based on the first output data signal and the second output data signal.

2. The display driving circuit of claim 1, wherein the jitter generator is further configured to adjust a frequency of the jitter according to the horizontal control signal.

3. The display driving circuit of claim 1, wherein the clock data recovery circuit comprises:
   a sampler circuit configured to sample the data signal by using the clock signal and generate a sample signal;
   a phase locked loop (PLL) circuit including the jitter generator and configured to generate the clock signal according to the sample signal; and
   a deserializer configured to receive the sample signal and generate the first output data signal.

4. The display driving circuit of claim 3, wherein the PLL circuit further comprises a voltage controlled oscillator configured to generate the clock signal, and
   wherein the jitter generator comprises:
      a clock divider configured to receive the clock signal and generate a frequency adjust clock signal according to a frequency control signal included in the horizontal control signal;

a counter configured to operate a counting operation by using the frequency adjust clock signal and generate a first current control signal and a second current control signal according to an amplitude control signal included in the horizontal control signal;

a first variable current source configured to generate a current provided to the voltage controlled oscillator according to the first current control signal; and a second variable current source configured to generate a current provided to the voltage controlled oscillator according to the second current control signal.

5. The display driving circuit of claim 4, wherein a level of a current generated by the first variable current source increases as the first current control signal increases, and a level of a current generated by the second variable current source decreases as the second current control signal increases.

6. The display driving circuit of claim 1, wherein the eye margin test circuit comprises:

a digital-analog converter configured to perform digital-analog conversion on a vertical control signal to generate the vertical measurement voltage;

a sampler circuit configured to sample the data signal by using the clock signal based on the vertical measurement voltage, and generate a sample signal; and a deserializer configured to receive the sample signal and generate the second output data signal.

7. The display driving circuit of claim 1, wherein the vertical measurement voltage corresponds to the amplitude of the jitter.

8. The display driving circuit of claim 1, further comprising an equalizer circuit configured to receive an input data signal from outside and transmit the input data signal as the data signal to the clock data recovery circuit and the eye margin test circuit.

9. A method of operating a display driving circuit, the method comprising:

generating a clock signal including jitter and varying an amplitude the jitter according to a horizontal control signal;

generating a vertical measurement voltage according to a vertical control signal;

sampling a data signal by using the clock signal and the vertical measurement voltage; and generating an eye margin test result signal of the data signal according to a sampled data signal.

10. The method of claim 9, the sampling comprises:

sampling the data signal based on the vertical measurement voltage having a first voltage level and the clock signal including the jitter having a first jitter amplitude corresponding to the first voltage level;

sampling the data signal based on the vertical measurement voltage having a second voltage level and the clock signal including the jitter having a second jitter amplitude corresponding to the second voltage level; and sampling the data signal based on the vertical measurement voltage having a third voltage level and the clock signal including the jitter having a third jitter amplitude corresponding to the third voltage level.

11. The method of claim 10, wherein an eye margin test target of an eye opening of the data signal is set for an eye margin measurement operation on the data signal, wherein the first voltage level and the first jitter amplitude correspond to an upper measurement point of the eye margin test target, wherein the second voltage level and the second jitter amplitude correspond to a middle measurement point of the eye margin test target, and wherein the third voltage level and the third jitter amplitude correspond to a lower measurement point of the eye margin test target.

12. The method of claim 9, further comprising:

receiving a data signal of a training pattern;

generating a plurality of clock signals, each having a jitter amplitude different from each other according to calibration codes;

sampling the data signal of the training pattern by using each of the plurality of clock signals;

measuring bit error rates of the data signal of the training pattern based on each of sampled data signals; and mapping the calibration codes on a value of a unit interval (UI) based on the measured bit error rates.

13. The method of claim 12, wherein the mapping comprises mapping a calibration code, in which a bit error is first generated, among the calibration codes, to the data signal of the training pattern, on the UI as a reference code.

14. The method of claim 12, further comprising:

storing a mapping table according the mapping of the calibration codes; and setting a maximum value of the horizontal control signal to be the UI according to the mapping table.

15. A display device configured to operate in a normal mode and an eye margin test (EMT) mode, the display device comprising:

a timing controller configured to transmit an input data signal and a control signal in the EMT mode; and a display driving circuit configured to receive the input data signal and the control signal to perform an eye margin measurement operation on the input data signal, wherein the display driving circuit is further configured to:

generate a clock signal including jitter based on the input data signal and the control signal;

generate a vertical measurement voltage based on the control signal; and sample data signal, which is generated based on the input data signal, by using the clock signal to perform the eye margin measurement operation based on the vertical measurement voltage, wherein a jitter amplitude of the jitter and a level of the vertical measurement voltage vary according to the control signal.

16. The display device of claim 15, wherein the timing controller is configured to transmit an EMT mode setting value to the display driving circuit, and wherein the EMT mode setting value comprises information regarding a vertical offset and a horizontal offset for the eye margin measurement operation and information regarding a threshold value for determining a pass/fail of the EMT mode.

17. The display device of claim 15, wherein the timing controller is configured to transmit a data signal of a training pattern to the display driving circuit, wherein the display driving circuit performs a calibration operation according to the data signal of the training pattern, and wherein the calibration operation comprises:

generating a plurality of clock signals, each having a jitter amplitude different from each other according to calibration codes;

sampling the data signal of the training pattern by using each of the plurality of clock signals;

measuring bit error rates of the data signal of the training pattern based on each of sampled data signals; and mapping the calibration codes on a value of a unit interval based on the measured bit error rates.

18. The display device of claim 15, wherein the display driving circuit is further configured to:

perform the eye margin measurement operation at a first measurement point by receiving a first input data signal of a random pattern and a first control signal in a first frame from the timing controller;

perform the eye margin measurement operation at an $n^{th}$ measurement point by receiving an $n^{th}$ input data signal of a random pattern and an $n^{th}$ control signal in an $n^{th}$ frame from the timing controller, where n is a natural number greater than or equal to 2; and determine the first measurement point according to the first control signal and the $n^{th}$ measurement point according to the $n^{th}$ control signal.

19. The display device of claim 18, wherein an EMT target of an eye opening of the data signal is set for the eye margin measurement operation, and wherein the first to $n^{th}$ measurement points include an upper measurement point of the EMT target, a middle measurement point of the EMT target, and a lower measurement point of the EMT target.

20. The display device of claim 15, wherein the display driving circuit is configured to transmit an EMT mode performance result obtained by performing the eye margin measurement operation to the timing controller, and the timing controller is configured to receive the EMT mode performance result and converts the EMT mode to the normal mode to display an image.

* * * * *